United States Patent [19]

Guimbal

[11] Patent Number: 5,639,214

[45] Date of Patent: Jun. 17, 1997

[54] VIBRATION DAMPING APPARATUS FOR HELICOPTER ROTOR

[75] Inventor: Bruno Guimbal, Les Milles, France

[73] Assignee: Eurocopter France, Marignane, France

[21] Appl. No.: 634,872

[22] Filed: Apr. 19, 1996

[30] Foreign Application Priority Data

Apr. 27, 1995 [FR] France ................... 95 05071

[51] Int. Cl.⁶ ................................................ F04D 29/00
[52] U.S. Cl. ................................. 416/145; 416/500
[58] Field of Search ........................... 416/144, 145, 416/500; 74/574

[56] References Cited

U.S. PATENT DOCUMENTS

| | | | |
|---|---|---|---|
| 2,225,929 | 12/1940 | Sarazin | 416/500 |
| 2,307,518 | 1/1943 | Larsen . | |
| 2,426,130 | 8/1947 | Wald | 416/145 |
| 2,471,687 | 5/1949 | Holmes . | |
| 3,035,643 | 5/1962 | Kelley et al. . | |
| 3,372,758 | 3/1968 | Jenney . | |
| 3,540,809 | 11/1970 | Paul et al. . | |
| 3,932,060 | 1/1976 | Vincent et al. . | |
| 3,988,073 | 10/1976 | Eastman et al. . | |
| 3,988,074 | 10/1976 | Kenigsberg et al. . | |
| 4,057,363 | 11/1977 | Kenigsberg et al. . | |
| 4,083,654 | 4/1978 | Kenigsberg et al. . | |
| 4,239,455 | 12/1980 | Broekhuizen et al. . | |
| 4,239,456 | 12/1980 | Joglekar et al. . | |

FOREIGN PATENT DOCUMENTS

| | | |
|---|---|---|
| 2530216 | 1/1984 | France . |
| 2123371 | 2/1984 | United Kingdom . |

*Primary Examiner*—John T. Kwon
*Attorney, Agent, or Firm*—Oliff & Berridge

[57] ABSTRACT

An apparatus has at least one pendulous member mounted on a rotor so as to be able to swing about an axis of pendular motion spaced at a distance from the center of inertia of the pendulous member. The pendulous member is pivotably mounted on its own axis of rotation parallel to the axis of pendular motion and situated substantially closer to the center of inertia of the pendulous member than to the axis of pendular motion.

32 Claims, 3 Drawing Sheets

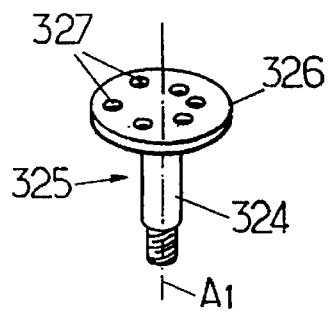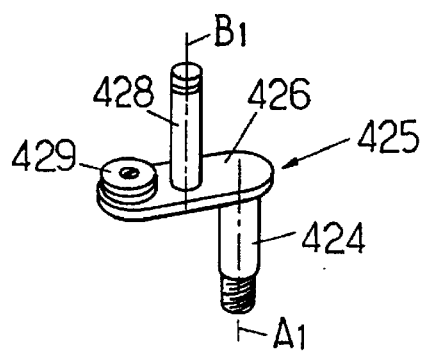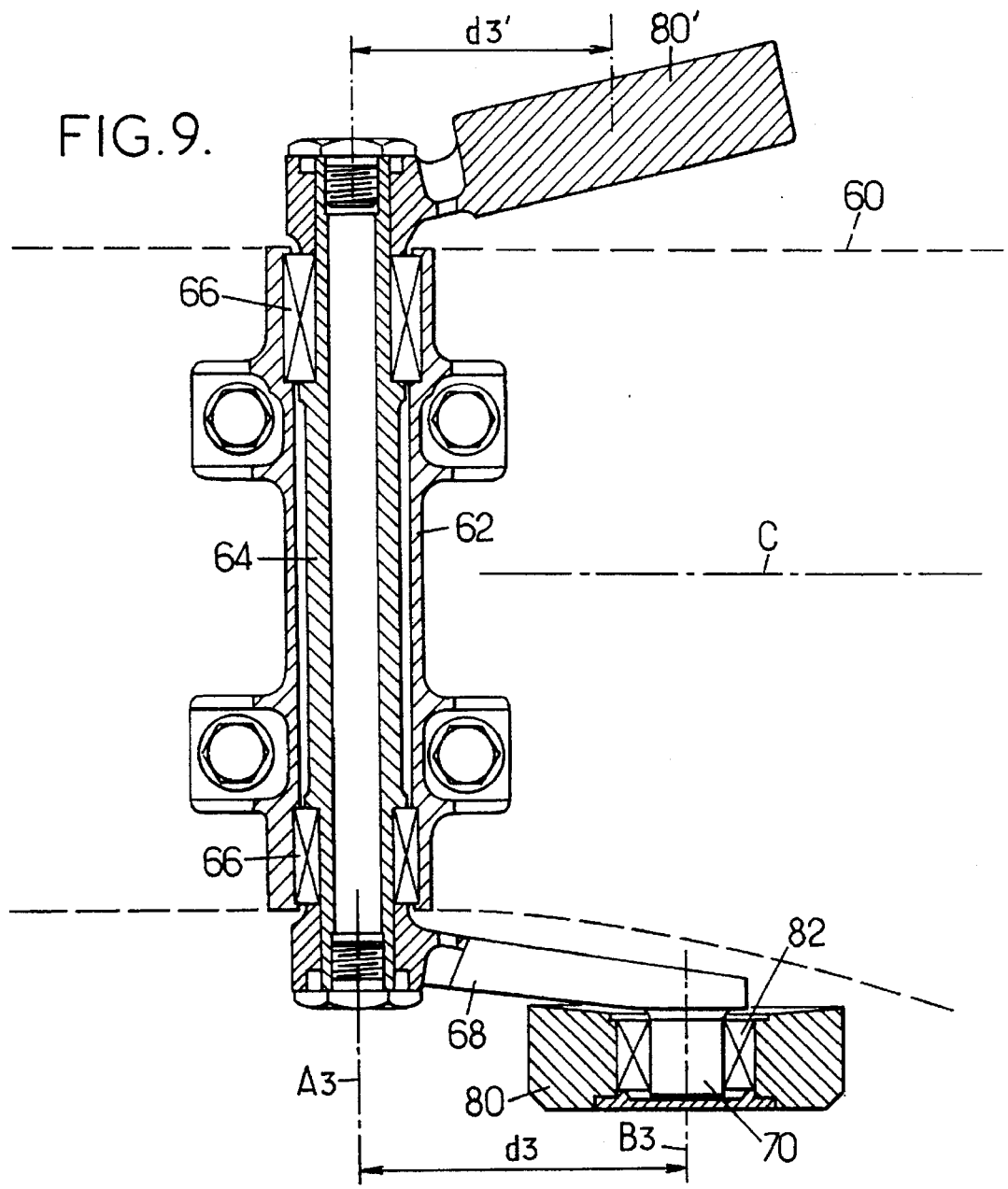

VIBRATION DAMPING APPARATUS FOR HELICOPTER ROTOR

BACKGROUND OF THE INVENTION

This invention relates to an apparatus for damping vibrations created by the movement of a helicopter rotor.

The connection, to the rotor hub, of pendulous members which swing under the effect of the centrifugal force, in order to damp or eliminate the vibration forces perpendicular to the rotor axis of rotation, called coplanar forces, is known in the prior art. By adjusting the dimensions (pendulum swing radius and distance between the axis of rotation and the center of gravity of the pendulous member), it is possible to adjust the natural swing angular frequency to an angular frequency at which it is desired to damp the vibrations. With respect to these coplanar forces, it is desirable to damp the vibrations of angular frequency (b−1)Ω and (b+1)Ω, where b denotes the number of rotor blades and Ω denotes the rotor angular speed of rotation. The aforementioned pendulum damping systems, such as described in U.S. Pat. No. 3,035,643, are rather limited with respect to their natural angular frequency. They are accordingly mainly suitable for helicopter rotors having a small number of blades. These limitations can be alleviated by utilizing a bifilar connection between the pendulous members and the hub (see U.S. Pat. No. 3,540,809). While this bifilar system is theoretically very interesting, it nevertheless presents a number of disadvantages in practice. Thus, the structural strength, in outdoor operating conditions, of the tracks of the bifilar connections poses a serious problem. The solutions adopted to solve this problem (for example, stainless steel, bearings, frequent grease lubrication) are not always convenient, and do not guarantee sufficient reliability (scaling, failure, . . . ), making them unsatisfactory. Furthermore, the simultaneous mounting of two assemblies, one for (b−1)Ω and the second for (b+1)Ω, is penalizing in terms of weight and size. The structural ratio, that is, the ratio of the movable mass to the total mass of the system, is finally mediocre.

An object of the present invention is to provide another pendular damping structure for helicopter rotor, which avoids at least some of the aforementioned limitations.

SUMMARY OF THE INVENTION

The invention accordingly provides a vibration damping apparatus for helicopter rotor, comprising at least one pendulous member mounted on the rotor so as to be able to swing about an axis of pendular motion spaced from the center of inertia of the pendulous member. The pendulous member is pivotally mounted about an axis of rotation, which is parallel to the axis of pendular motion, and is positioned substantially closer to the center of inertia of the pendulous member than to the axis of pendular motion.

The rotation of the pendulous member about itself substantially reduces the effects of the inertia of the pendulous member, effects which limit the natural angular frequencies at which the vibrations can be damped. In comparison with bifilar systems, greater freedom is also provided in the choice of the connecting structure for the pendulous members, making it possible to reduce the influence of the limitations that affect bifilar systems.

By way of illustration, FIG. 1 shows a pendulous member 6 articulated at A (axis of pendular motion) to a member 8 rotating about an axis O at an angular velocity Ω. L denotes the connecting radius, that is, the distance between axes O and A. d denotes the eccentricity of the pendulum, that is, the distance between axis A and the center of inertia of the pendulous member 6. If m denotes the mass of the pendulous member 6 and $I_0$ its inertia about the axis parallel to O and A and passing through its center of inertia, the centrifugal force Fc imparts to the pendulous member 6 a natural angular frequency ω given by:

$$\omega = \Omega \sqrt{\frac{dL}{d^2 + I_0/m}} \quad (1)$$

In other words, the eccentricity d is a root of the equation:

$$d^2 - \frac{Ld}{(\omega/\Omega)^2} + \frac{I_0}{m} = 0 \quad (2)$$

The relationship between the natural angular frequency and the eccentricity is shown by curve I in FIG. 2, in the particular case of a cylindrical pendulous member of radius r=50 mm with L=340 mm. It may be observed that, for a given ratio $I_0/m$ and a given radius L, the simple pendulum system has a natural angular frequency which is limited to $\omega_M = \Omega(mL^2/4\,I_0)^{1/4}$, for $d=(I_0/m)^{1/2}$, which corresponds to the case in which equation (2) accepts a double root (point M). In the case of a cylindrical body of radius r, to have a relatively high ratio of ω to Ω, it is therefore necessary to select a very small radius r, which creates problems of application.

On the graph in FIG. 2, curve II shows the ideal case of a point mass ($I_0=0$), for which $(\omega/\Omega)^2=L/d$. This ideal case is theoretically the case of the bifilar systems, of which the kinematics is such that the pendulous members only exhibit a movement of translation relatively to their support. This is also the case of an apparatus according to the invention, when the specific axis of rotation of the pendulous member passes through its center of inertia, which cancels the term $I_0$ in the aforementioned equations (1) and (2). Since the coplanar dynamic force created by the pendulous members is proportional to the eccentricity d and to the mass m, the dynamic efficiency of damping for a given mass is proportional to d. The mass efficiency E of a pendulum can accordingly be defined as the ratio of its eccentricity d to the eccentricity $dII=L/(\omega/\Omega)^2=d+I_0/md$ that a point mass would have to obtain the same natural angular frequency, hence:

$$E = \frac{d^2}{d^2 + I_0/m} = \left(\frac{d}{L}\right)\left(\frac{\omega}{\Omega}\right)^2$$

This mass efficiency is 1 in the case of an ideal bifilar system or of a pendulous member which, according to the invention, pivots freely about its center of inertia. In fact, the total efficiency to be considered is the product of the mass efficiency E times the structural ratio of the apparatus. In this respect, the greater freedom of design procured by the invention, by providing for a lower total mass for the same pendulous mass, gives it a significant advantage relatively to bifilar systems.

In an apparatus according to the invention, the pendulous member may rotate about an axis which is slightly offset relatively to its center of inertia. This can serve to limit the rotation of the pendulous member, although such rotation is a priori acceptable, or for the purpose of adjustment. Thereby a double pendulum is obtained, whose second eccentricity must nevertheless remain small in comparison with the principal eccentricity d so that the corresponding natural angular frequency is very high.

Preferably, an apparatus according to the invention, for damping vibrations in a plane perpendicular to the rotor axis of rotation, the axis of pendular motion being substantially parallel to the rotor axis of rotation, comprises at least one arm rotating together with the rotor hub, said arm supporting a first pendulous member which is movable about a first axis of pendular motion spaced from the center of inertia of the first pendulous member and substantially parallel to the rotor axis of rotation, the first pendulous member being pivotally mounted about an axis of rotation, which is parallel to the first axis of pendular motion and is situated substantially closer to the center of inertia of the first pendulous member than to the first axis of pendular motion, and the arm further supporting a second pendulous member movable about a second axis of pendular motion spaced from the center of inertia of the second pendulous member and substantially parallel to the rotor axis of rotation. If the number of blades b is not too large (for example b=3), it is thus possible to provide for the first pendulous members to be tuned to the natural angular frequency (b+1) $\Omega$ and for the second pendulous members to be tuned to the natural angular frequency (b−1) $\Omega$. It is thereby possible to arrange the second pendulous member so as to have a simple pendular motion, that is, so that its only degree of freedom is its swing about the second axis of pendular motion. If a sub-optimal mass efficiency is acceptable, a tuning of the second pendulous members in the vicinity of point M (FIG. 2), that is, with $I_0/m \simeq L^2[4(\omega/\Omega)^4]=L^2/[4(b-1)^4]$, or $r \simeq L/[\sqrt{2}(b-1)^2]$ in the case of a cylindrical body of radius r, accordingly offers an advantage: this tuning is quite insensitive to manufacturing tolerances or to wear, and a certain latitude is procured in the position of the second axis of pendular motion. However, at point M, the mass efficiency E is only 0.5, so that it may be necessary to reduce the ratio $I_0/m$ relatively to the aforementioned value, to find a compromise between the mass efficiency and the convenience and reliability of assembly.

An apparatus according to the invention can be used to damp rotor vibrations other than coplanar vibrations, particularly the vibrations generated by the flapping of each blade. It is known to provide, at the root of each blade, a pendular damping element whose axis of pendular motion is perpendicular to the rotor axis and to the span of the blade (see French Patent No. 2,530,216 or U.S. Pat. No. 4,239,456). By providing, according to the invention, for these pendulous members to rotate about themselves, the mass efficiency of damping can easily be improved.

BRIEF DESCRIPTION OF THE DRAWINGS

FIGS. 7 and 8 are perspective views of assembly elements of pendulous members according to the invention.

FIG. 9 is a schematic cross-sectional view of a damping apparatus at the root of the blade according to the invention.

DESCRIPTION OF PREFERRED EMBODIMENTS

Figure 1:
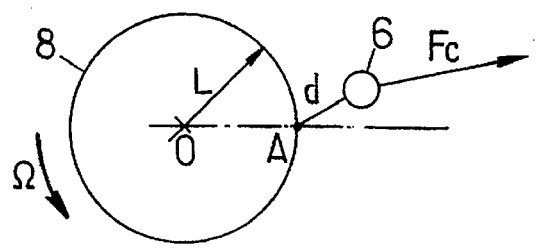
FIGS. 1 and 2, previously discussed, are a diagrammatic representation and a graph illustrating the dynamics of a simple pendulum system for damping vibrations.
Figure 2:
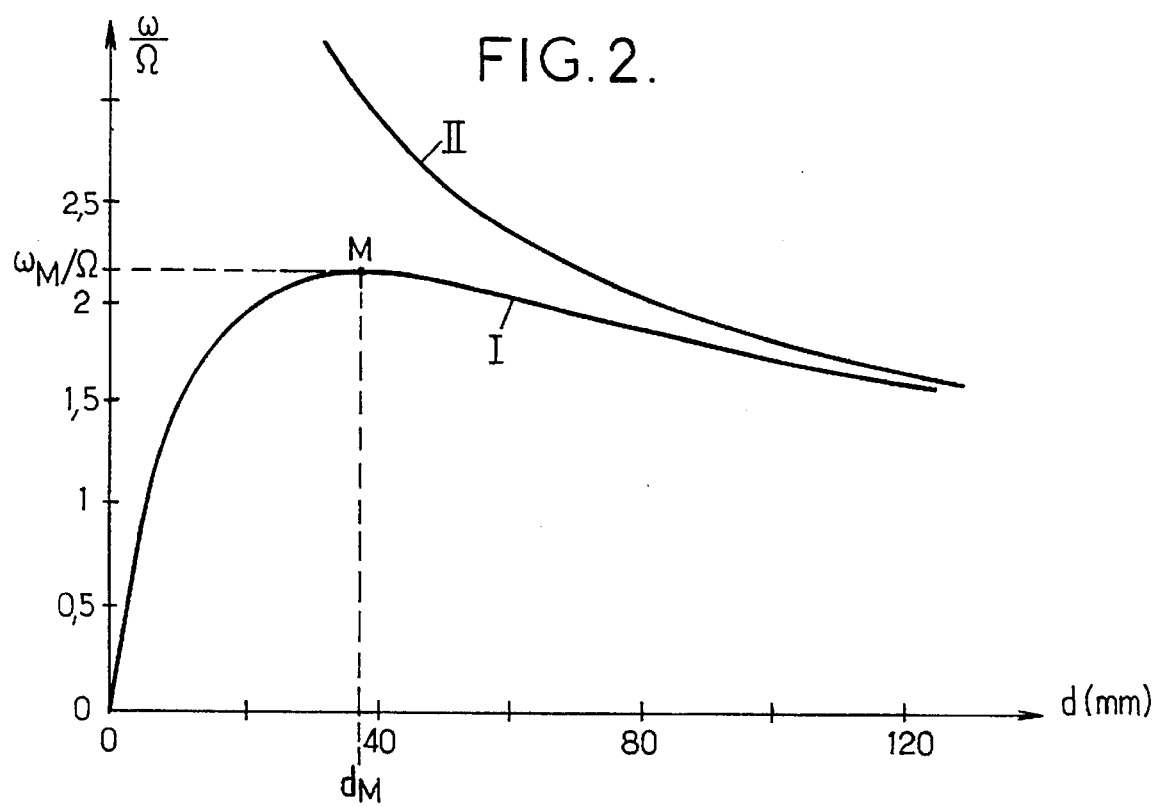
Figure 3:
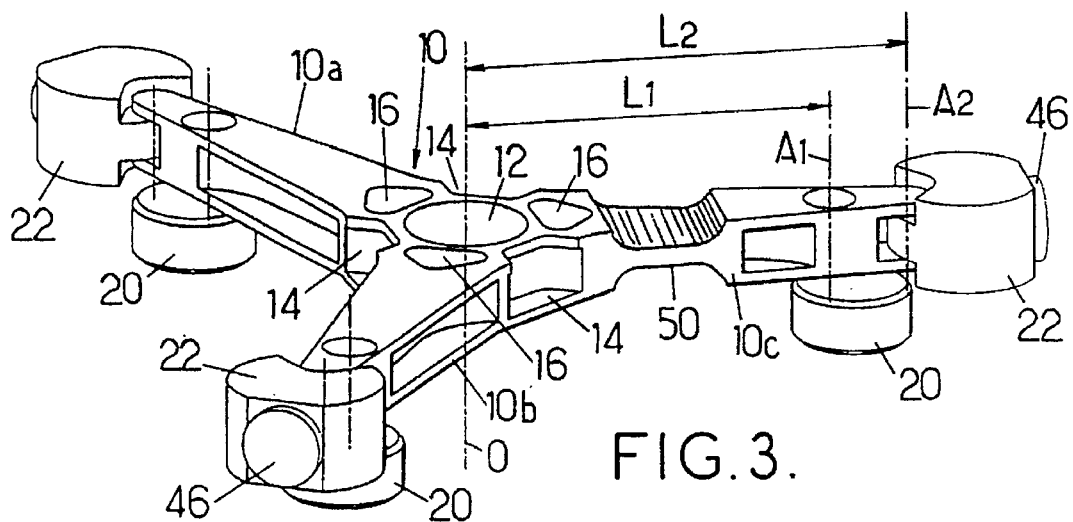
FIG. 3 is a perspective view of a coplanar vibration damping apparatus according to the invention.

FIG. 3 shows a coplanar vibration damping apparatus for a main rotor of a three-bladed helicopter. This apparatus comprises a support 10 having three radial arms 10a, 10b and 10c extending at 120 degrees to each other in a plane perpendicular to the rotor axis of rotation O. Support 10 has a central bore 12 to receive the rotor drive shaft (not shown). Between arms 10a, 10b and 10c, the central portion of support 10 comprises three radial apertures 14 at the ends of which support 10 is bolted to the shaft. At the base of arms 10a, 10b and 10c, the central portion of support 10 further comprises three axial apertures 16 opening upward, at the bottom of which support 10 is bolted to the hub (not shown) of the rotor supporting the three blades. Each of the blades extends in a direction that is diametrically opposed to that of one of the arms 10a, 10b and 10c.

Figure 4:
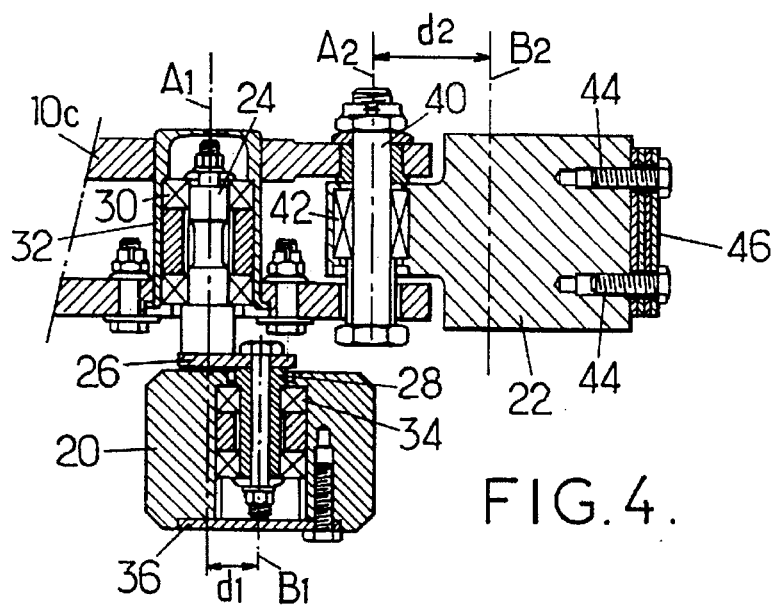
FIG. 4 is a sectional view taken along a radial plane of a portion of the apparatus of FIG. 3.

Each arm 10a, 10b and 10c supports, near its end, two pendulous members 20, 22, the arrangement thereof being shown in greater detail in the cross-sectional view in FIG. 4, taken along a radial plane. Pendulous members 20 are arranged to damp coplanar vibrations of natural frequency (b+1)$\Omega$ (where $\Omega$ denotes the angular speed of rotation of the rotor about axis O, and b denotes the number of rotor blades, i.e. b=3 in the example considered), and pendulous members 22 are arranged to damp coplanar vibrations of natural frequency (b−1)$\Omega$.

Pendulous members 20 are mounted on support 10 so as to oscillate about an axis of pendular motion A1 parallel to the rotor axis of rotation O and positioned at a distance L1 from said axis. Pendulous member 20 can also pivot freely about an axis B1 passing through its center of inertia and parallel to axes O and A1. The eccentricity d1 of pendulous member 20 corresponds to the distance between axes A1 and B1. The tuning of the first pendulous members 20 to natural frequency (b+1)$\Omega$ consists in adjusting the eccentricity d1 so as to satisfy $d1 \simeq L1/(b+1)^2$.

In the arrangement shown in FIG. 4, pendulous member 20 is mounted on arm 10c via a first pin 24 extending along axis A1, via a spacer member 26 integral with pin 24 and extending transversally thereto to define the eccentricity d1, and via a bushing ring 28 bolted to the spacer member 26 and extending along B1. Ball bearings 30 insure the free rotation of pin 24 relatively to arm 10c along axis A1. The bearings 30 are, for example, placed between pin 24 and a cylindrical tube 32 attached to arm 10c and closed at its upper end to form a protective cover for the joint. Other ball bearings 34 are placed between bushing 28 and pendulous member 20 to insure the free rotation of said pendulous member about axis B1.

It is possible to provide for an adjustment of the mass of the pendulous members 20 which does not alter the frequency tuning. In the example shown in FIG. 4, this is achieved by attaching adjusting weights 36, in the form of discs centered on axis B1, to the bottom portion of pendulous member 20.

It will be understood that many different arrangements can be utilized to realize the double joint of the pendulous members 20. Without any implied limitation, FIGS. 5 and 6 illustrate two alternative arrangements, wherein the pendulous members are placed at the fork-shaped end of the arm.

Figure 5:
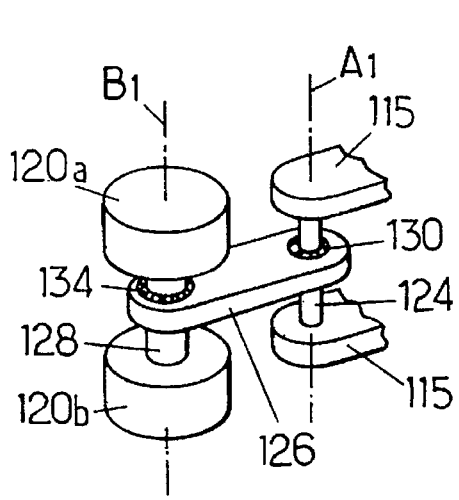
FIGS. 5 and 6 are perspective views of alternative arrangements of pendulous members according to the invention.

In the example in FIG. 5, the pendulous member is divided into two halves 120a, 120b connected by a pin 128. Another pin 124 is attached between the two branches 115 of the fork. The spacer member 126 is articulated at its ends on the two pins 124, 128 via respective ball bearings 130, 134.

Figure 6:
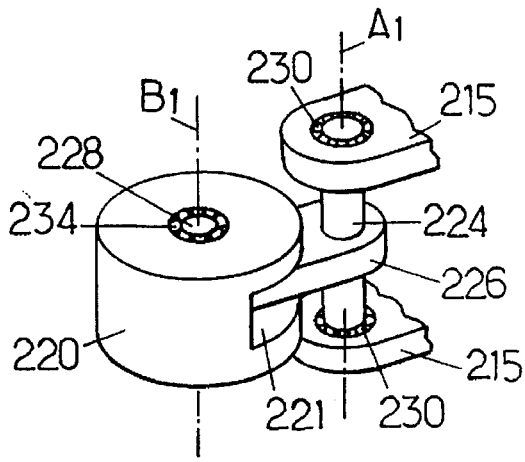

In the example in FIG. 6, the pendulous member 220 is supported by an H-shaped member comprising the spacer member 226 and, separated by the distance d1, the two pins 224, 228. Pendulous member 220, of generally cylindrical shape, has a radial slot 221 to permit the passage of the spacer member 226. The first pin 224 is articulated on the two branches 215 of the fork via ball bearings 230. Pendulous member 220 is articulated on the second pin 228 via ball bearings 234. In the example in FIG. 6, the axis of rotation B1 of the pendulous member about itself is slightly offset relatively to the position of its center of inertia, so that when the rotor rotates at velocity $\Omega$, the angular amplitude of rotation of pendulous member 220 about itself is limited. A double pendulum is thereby realized, the second frequency whereof nevertheless remaining very high. The angular width of slot 221 is selected to be sufficient so that pendulous member 220 does not collide with spacer member 226 within the limits of its angular swing amplitude about axis B1.

The invention advantageously provides means for adjusting the distance between axis of pendular motion A1 and axis of rotation B1 of the pendulous member. This distance can be adjusted by means of a mount such as shown in FIG. 7. This mount 325 comprises a pin 324 designed to be pivotally mounted on the arm of support 10, and a spacer member 326 extended perpendicularly to pin 24, that is, to axes A1 and B1. Spacer member 326 comprises a plurality of apertures 327 (six in the example shown) situated at different distances from axis A1. These apertures 327 serve to install a second pin (not shown) defining axis B1 by selecting eccentricity d1. In the example shown in FIG. 7, spacer member 326 is made integral with pin 324, but it should be understood that said pin 324 could also be attached by bolts in one of the apertures 327, thereby providing greater latitude in selecting the distance between the two pins.

FIG. 8 shows another arrangement of mount 425 which can be used to install the pendulous members 20. Said mount is in the shape of a crankshaft having a first pin 428 extending along axis B1 and pivotally receiving pendulous body 20, a second pin 424 extending along axis A1 and designed to be pivotally mounted on the arm of support 10, and a spacer member 426 to which pins 424, 428 are attached. Spacer member 426 comprises, beyond pin 428 relatively to pin 424, an aperture (not shown in FIG. 8) to which adjusting weights 429 can be screwed.

The pendulous members 22, shown at the end of the arms 10a, 10b and 10c in FIGS. 3 and 4, have a simple pendular motion relatively to support 10 when the rotor rotates. Their axes of pendular motion A2 are parallel to rotor axis of rotation O, and separated from it by a distance L2. Distance d2 between the axis of pendular motion A2 and axis B2 parallel thereto and passing through the center of inertia of pendulous member 22, is selected in order to satisfy the following equation:

$$(d2)^2 = (L2)(d2)/(b-1)^2 + I_0/m \approx 0$$

in order to tune pendulous members 22 to the natural angular frequency $(b-1)\Omega$. In the aforementioned equation, $I_0$ denotes the moment of inertia of body 22 relatively to axis B2, and m denotes its mass.

In the arrangement shown in FIG. 4, arm 10c of the support terminates in the form of a fork. A pin 40 is attached between the two branches of said fork along axis A2. Pendulous member 22 is mounted on this pin 40 via ball bearings 42, thereby enabling it to pivot about axis A2. On its side opposite to pin 40, pendulous member 22 has threaded holes 44 suitable for screwing adjusting weights 46. Adding weights 46 causes an increase in the ratio $I_0/m$ thereby decreasing the tuning frequency. Conversely, in order to increase the tuning frequency, weights can be fixed in the form of small-diameter discs at a position centered on axis B2.

For the apparatus to be able also to damp vibrations parallel to rotor axis of rotation O, generated by the flapping of the blades, it can be provided for the arms 10a, 10b and 10c of support 10 to comprise, between axis O and the axes of pendular motion A1, A2, a thinned portion along the dimension parallel to axis O. Said thinned portion 50 is shown in FIG. 3, only for arm 10c. Said portion 50 is so thinned as to have a flexibility enabling the members 20, 22 to flap and thereby damp the rotor vibrations parallel to axis O. In the case of a three-blade rotor, thinned portion 50 can be dimensioned in particular to damp flapping modes of angular frequency $6\Omega$.

FIG. 9 shows a vibration damping apparatus at the root of a blade. This apparatus is essentially symmetrical about the span axis C of blade 60. For purposes of comparison, however, an apparatus according to the invention is shown in the bottom portion of FIG. 9, and a conventional damping member at the root of the blade is shown in the upper portion of FIG. 9. The apparatus comprises a tubular support 62 attached to blade 60 or incorporated therein. The bore of tubular support 62 defines the axis of pendular motion A3 which is perpendicular both to the blade span axis C and to the rotor axis of rotation O. A pin 64 is pivotally mounted about axis A3 in support 62, via ball bearings 66. At each end of pin 64, an arm 68 is attached extending transversally to axis A3. At its end opposite pin 64, arm 68 comprises a cylindrical finger 70 extending along axis B3 parallel to axis A3 and situated at a distance d3 therefrom. Pendulous member 80 is pivotally mounted on finger 70 via ball bearings 82, so that its center of inertia is positioned on axis of rotation B3. Starting with a conventional design of a pendulum damping element at the root of the blade, wherein the pendulous member 80' of mass m3' has a simple pendular movement of eccentricity d3' about axis A3 (see upper portion of FIG. 9), with a mass efficiency E<1 (for example E=0.85), one can thereby reduce the pendulous mass by a factor E by increasing the eccentricity d3 by a factor 1/E. The same operation is thereby obtained (same frequency tuning, same absorption of vibrations, and same angular amplitudes), but with a significantly lower weight.

I claim:

1. Vibration damping apparatus for a helicopter rotor, comprising at least one pendulous member swingably mounted on the rotor about an axis of pendular motion spaced from the center of inertia of the pendulous member, said rotor having a rotor axis of rotation, wherein the pendulous member is pivotally mounted about a pendulous member axis of rotation parallel to the axis of pendular motion and passing through the center of inertia of the pendulous member.

2. Apparatus according to claim 1, further comprising means for adjusting a distance between the axis of pendular motion and the pendulous member axis of rotation.

3. Apparatus according to claim 2, wherein the distance adjusting means comprise a spacer member extending transversally to the axis of pendular motion and to the pendulous member axis of rotation, and two pins respectively attached to the spacer member along the axis of pendular motion and the pendulous member axis of rotation, a plurality of apertures being arranged in the spacer member to permit the installation of the pins by selecting the distance between them.

4. Apparatus according to claim 1, wherein the pendulous member is mounted on a crankshaft having a first pin extending along the pendulous member axis of rotation and pivotally receiving said pendulous member, a second pin extending along the axis of pendular motion and a spacer member whereto the first and second pins are attached, the spacer member comprising means for receiving adjusting weights.

5. Apparatus according to claim 1, for damping vibrations in a plane perpendicular to the rotor axis of rotation, wherein the axis of pendular motion is substantially parallel to the rotor axis of rotation, the apparatus comprising at least one arm rotating together with a hub of the rotor, said at least one arm supporting a first pendulous member movable about a first axis of pendular motion spaced from the center of inertia of the first pendulous member and substantially parallel to the rotor axis of rotation, the first pendulous member being pivotally mounted about a respective pendulous member axis of rotation parallel to the first axis of pendular motion and situated substantially closer to the center of inertia of the first pendulous member than to the first axis of pendular motion, and said at least one arm further supporting a second pendulous member movable about a second axis of pendular motion spaced from the center of inertia of the second pendulous member and substantially parallel to the rotor axis of rotation.

6. Apparatus according to claim 5, wherein the second pendulous member is mounted so that its only degree of freedom is its swing about the second axis of pendular motion.

7. Apparatus according to claim 6, wherein, in order to damp vibrations at a natural frequency $\omega$ equal to a predetermined number of times the angular velocity $\Omega$ of the rotor by means of the second pendulous member, the second pendulous member is arranged so as to approximately satisfy the equation:

$$I_0/m = L^2/[4/(\omega/\Omega)^4]$$

where m denotes the mass of the second pendulous member, $I_0$ denotes the inertia of the second pendulous member about an axis parallel to the second axis of pendular motion and passing through its center of inertia, and L denotes the distance between the rotor axis of rotation and the second axis of pendular motion.

8. Apparatus according to claim 6, wherein, the rotor comprising a number b of blades, the first pendulous member is tuned to damp vibrations of angular frequency (b+1) $\Omega$ and the second pendulous member is tuned to damp vibrations of angular frequency (b−1) $\Omega$, where $\Omega$ denotes the angular velocity of the rotor.

9. Apparatus according to claim 1, for damping both vibrations in a plane perpendicular to the rotor axis of rotation and vibrations parallel to the rotor axis of rotation, the axis of pendular motion being substantially parallel to the rotor axis of rotation, wherein each pendulous member is mounted on a respective arm rotating together with a hub of the rotor, said arm comprising, between the rotor axis of rotation and the axis of pendular motion, a portion having a flexibility adapted to damp vibrations of the rotor parallel to the axis of rotation thereof.

10. Apparatus according to claim 1, wherein the rotor has a plurality of blades each having a respective root, the apparatus being arranged for damping vibrations at the blade roots, and comprising, for each one of the blades, a pendulous member swinging about a respective axis of pendular motion perpendicular to the rotor axis of rotation and to a span of said one of the blades.

11. Vibration damping apparatus for a helicopter rotor, comprising at least one pendulous member swingably mounted on the rotor about an axis of pendular motion spaced from the center of inertia of the pendulous member, said rotor having a rotor axis of rotation, wherein the pendulous member is pivotally mounted about a pendulous member axis of rotation parallel to the axis of pendular motion and situated substantially closer to the center of inertia of the pendulous member than to the axis of pendular motion, the apparatus further comprising means for adjusting a distance between the axis of pendular motion and the pendulous member axis of rotation.

12. Apparatus according to claim 11, wherein the distance adjusting means comprise a spacer member extending transversally to the axis of pendular motion and to the pendulous member axis of rotation, and two pins respectively attached to the spacer member along the axis of pendular motion and the pendulous member axis of rotation, a plurality of apertures being arranged in the spacer member to permit the installation of the pins by selecting the distance between them.

13. Apparatus according to claim 11, wherein the pendulous member is mounted on a crankshaft having a first pin extending along the pendulous member axis of rotation and pivotally receiving said pendulous member, a second pin extending along the axis of pendular motion and a spacer member whereto the first and second pins are attached, the spacer member comprising means for receiving adjusting weights.

14. Apparatus according to claim 11, for damping vibrations in a plane perpendicular to the rotor axis of rotation, wherein the axis of pendular motion is substantially parallel to the rotor axis of rotation, the apparatus comprising at least one arm rotating together with a hub of the rotor, said at least one arm supporting a first pendulous member movable about a first axis of pendular motion spaced from the center of inertia of the first pendulous member and substantially parallel to the rotor axis of rotation, the first pendulous member being pivotally mounted about a respective pendulous member axis of rotation parallel to the first axis of pendular motion and situated substantially closer to the center of inertia of the first pendulous member than to the first axis of pendular motion, and said at least one arm further supporting a second pendulous member movable about a second axis of pendular motion spaced from the center of inertia of the second pendulous member and substantially parallel to the rotor axis of rotation.

15. Apparatus according to claim 14, wherein the second pendulous member is mounted so that its only degree of freedom is its swing about the second axis of pendular motion.

16. Apparatus according to claim 15, wherein, in order to damp vibrations at a natural frequency $\omega$ equal to a predetermined number of times the angular velocity $\Omega$ of the rotor by means of the second pendulous member, the second pendulous member is arranged so as to approximately satisfy the equation:

$$I_0/m = L^2/[4/(\omega/\Omega)^4]$$

where m denotes the mass of the second pendulous member, $I_0$ denotes the inertia of the second pendulous member about an axis parallel to the second axis of pendular motion and passing through its center of inertia, and L denotes the distance between the rotor axis of rotation and the second axis of pendular motion.

17. Apparatus according to claim 15, wherein, the rotor comprising a number b of blades, the first pendulous member is tuned to damp vibrations of angular frequency (b+1) $\Omega$ and the second pendulous member is tuned to damp vibrations of angular frequency (b−1) $\Omega$, where $\Omega$ denotes the angular velocity of the rotor.

18. Apparatus according to claim 11, for damping both vibrations in a plane perpendicular to the rotor axis of rotation and vibrations parallel to the rotor axis of rotation, the axis of pendular motion being substantially parallel to the rotor axis of rotation, wherein each pendulous member is mounted on a respective arm rotating together with a hub of the rotor, said arm comprising, between the rotor axis of rotation and the axis of pendular motion, a portion having a flexibility adapted to damp vibrations of the rotor parallel to the axis of rotation thereof.

19. Apparatus according to claim 11, wherein the rotor has a plurality of blades each having a respective root, the apparatus being arranged for damping vibrations at the blade roots, and comprising, for each one of the blades, a pendulous member swinging about a respective axis of pendular motion perpendicular to the rotor axis of rotation and to a span of said one of the blades.

20. Vibration damping apparatus for a helicopter rotor, comprising at least one pendulous member swingably mounted on the rotor about an axis of pendular motion spaced from the center of inertia of the pendulous member, said rotor having a rotor axis of rotation, wherein the pendulous member is pivotally mounted about a pendulous member axis of rotation parallel to the axis of pendular motion and situated substantially closer to the center of inertia of the pendulous member than to the axis of pendular motion, and wherein the pendulous member is mounted on a crankshaft having a first pin extending along the pendulous member axis of rotation and pivotally receiving said pendulous member, a second pin extending along the axis of pendular motion and a spacer member whereto the first and second pins are attached, the spacer member comprising means for receiving adjusting weights.

21. Apparatus according to claim 20, for damping vibrations in a plane perpendicular to the rotor axis of rotation, wherein the axis of pendular motion is substantially parallel to the rotor axis of rotation, the apparatus comprising at least one arm rotating together with a hub of the rotor, said at least one arm supporting a first pendulous member movable about a first axis of pendular motion spaced from the center of inertia of the first pendulous member and substantially parallel to the rotor axis of rotation, the first pendulous member being pivotally mounted about a respective pendulous member axis of rotation parallel to the first axis of pendular motion and situated substantially closer to the center of inertia of the first pendulous member than to the first axis of pendular motion, and said at least one arm further supporting a second pendulous member movable about a second axis of pendular motion spaced from the center of inertia of the second pendulous member and substantially parallel to the rotor axis of rotation.

22. Apparatus according to claim 21, wherein the second pendulous member is mounted so that its only degree of freedom is its swing about the second axis of pendular motion.

23. Apparatus according to claim 22, wherein, in order to damp vibrations at a natural frequency $\omega$ equal to a predetermined number of times the angular velocity $\Omega$ of the rotor by means of the second pendulous member, the second pendulous member is arranged so as to approximately satisfy the equation:

$$I_0/m = L^2/[4/(\omega/\Omega)^4]$$

where m denotes the mass of the second pendulous member, $I_0$ denotes the inertia of the second pendulous member about an axis parallel to the second axis of pendular motion and passing through its center of inertia, and L denotes the distance between the rotor axis of rotation and the second axis of pendular motion.

24. Apparatus according to claim 22, wherein, the rotor comprising a number b of blades, the first pendulous member is tuned to damp vibrations of angular frequency (b+1) $\Omega$ and the second pendulous member is tuned to damp vibrations of angular frequency (b−1) $\Omega$, where $\Omega$ denotes the angular velocity of the rotor.

25. Apparatus according to claim 20, for damping both vibrations in a plane perpendicular to the rotor axis of rotation and vibrations parallel to the rotor axis of rotation, the axis of pendular motion being substantially parallel to the rotor axis of rotation, wherein each pendulous member is mounted on a respective arm rotating together with a hub of the rotor, said arm comprising, between the rotor axis of rotation and the axis of pendular motion, a portion having a flexibility adapted to damp vibrations of the rotor parallel to the axis of rotation thereof.

26. Apparatus according to claim 20, wherein the rotor has a plurality of blades each having a respective root, the apparatus being arranged for damping vibrations at the blade roots, and comprising, for each one of the blades, a pendulous member swinging about a respective axis of pendular motion perpendicular to the rotor axis of rotation and to a span of said one of the blades.

27. Vibration damping apparatus for a helicopter rotor, comprising at least one pendulous member swingably mounted on the rotor about an axis of pendular motion spaced from the center of inertia of the pendulous member, said rotor having a rotor axis of rotation, wherein the pendulous member is pivotally mounted about a pendulous member axis of rotation parallel to the axis of pendular motion and situated substantially closer to the center of inertia of the pendulous member than to the axis of pendular motion, wherein for damping vibrations in a plane perpendicular to the rotor axis of rotation, the axis of pendular motion is substantially parallel to the rotor axis of rotation, the apparatus comprising at least one arm rotating together with a hub of the rotor, said at least one arm supporting a first pendulous member movable about a first axis of pendular motion spaced from the center of inertia of the first pendulous member and substantially parallel to the rotor axis of rotation, the first pendulous member being pivotally mounted about a respective pendulous member axis of rotation parallel to the first axis of pendular motion and situated substantially closer to the center of inertia of the first pendulous member than to the first axis of pendular motion, and said at least one arm further supporting a second pendulous member movable about a second axis of pendular motion spaced from the center of inertia of the second pendulous member and substantially parallel to the rotor axis of rotation.

28. Apparatus according to claim 27, wherein the second pendulous member is mounted so that its only degree of freedom is its swing about the second axis of pendular motion.

29. Apparatus according to claim 28, wherein, in order to damp vibrations at a natural frequency $\omega$ equal to a predetermined number of times the angular velocity $\Omega$ of the rotor by means of the second pendulous member, the second pendulous member is arranged so as to approximately satisfy the equation:

$$I_0/m = L^2/[4/(\omega/\Omega)^4]$$

where m denotes the mass of the second pendulous member, $I_0$ denotes the inertia of the second pendulous member about an axis parallel to the second axis of pendular motion and passing through its center of inertia, and L denotes the distance between the rotor axis of rotation and the second axis of pendular motion.

30. Apparatus according to claim 28, wherein, the rotor comprising a number b of blades, the first pendulous member is tuned to damp vibrations of angular frequency (b+1) $\Omega$ and the second pendulous member is tuned to damp vibrations of angular frequency (b−1) $\Omega$, where $\Omega$ denotes the angular velocity of the rotor.

31. Apparatus according to claim 27, for damping both vibrations in a plane perpendicular to the rotor axis of rotation and vibrations parallel to the rotor axis of rotation, the axis of pendular motion being substantially parallel to the rotor axis of rotation, wherein each pendulous member is mounted on a respective arm rotating together with a hub of the rotor, said arm comprising, between the rotor axis of rotation and the axis of pendular motion, a portion having a flexibility adapted to damp vibrations of the rotor parallel to the axis of rotation thereof.

32. Vibration damping apparatus for a helicopter rotor, comprising at least one pendulous member swingably mounted on the rotor about an axis of pendular motion spaced from the center of inertia of the pendulous member, said rotor having a rotor axis of rotation, wherein the pendulous member is pivotally mounted about a pendulous member axis of rotation parallel to the axis of pendular motion and situated substantially closer to the center of inertia of the pendulous member than to the axis of pendular motion, and wherein for damping both vibrations in a plane perpendicular to the rotor axis of rotation and vibrations parallel to the rotor axis of rotation, the axis of pendular motion is substantially parallel to the rotor axis of rotation, and each pendulous member is mounted on a respective arm rotating together with a hub of the rotor, said arm comprising, between the rotor axis of rotation and the axis of pendular motion, a portion having a flexibility adapted to damp vibrations of the rotor parallel to the axis of rotation thereof.

* * * * *